United States Patent
Abordi et al.

(10) Patent No.: US 7,057,320 B2
(45) Date of Patent: Jun. 6, 2006

(54) MECHANICAL DRIVE SYSTEM OPERATING BY MAGNETIC FORCE

(75) Inventors: Maurizio Abordi, Paderno Dugnano (IT); Alberto Cerizza, Carugate (IT)

(73) Assignee: C.D.R. Pompe S.p.A., Senago (IT)

( * ) Notice: Subject to any disclaimer, the term of this patent is extended or adjusted under 35 U.S.C. 154(b) by 0 days.

(21) Appl. No.: 10/433,265

(22) PCT Filed: Nov. 30, 2000

(86) PCT No.: PCT/IT00/00496

§ 371 (c)(1),
(2), (4) Date: Oct. 24, 2003

(87) PCT Pub. No.: WO02/45246

PCT Pub. Date: Jun. 6, 2002

(65) Prior Publication Data

US 2004/0061395 A1    Apr. 1, 2004

(51) Int. Cl.
*H02K 49/00* (2006.01)
*H02K 1/30* (2006.01)
*F04B 17/00* (2006.01)

(52) U.S. Cl. .............. 310/103; 417/420; 310/104; 310/156.12; 310/156.28; 310/114; 464/29

(58) Field of Classification Search .......... 310/103, 310/114–115, 156.11–156.15, 118–119, 121–122, 310/75 R, 75 D; 464/29; 417/420; 192/84.3, 192/84.6

See application file for complete search history.

(56) References Cited

U.S. PATENT DOCUMENTS

| | | | | |
|---|---|---|---|---|
| 3,828,212 A | * | 8/1974 | Harkness et al. | 310/153 |
| 4,080,112 A | * | 3/1978 | Zimmermann | 417/420 |
| 4,120,618 A | * | 10/1978 | Klaus | 417/420 |
| 4,304,532 A | * | 12/1981 | McCoy | 417/420 |
| 4,414,523 A | * | 11/1983 | Pieters | 335/302 |
| 4,871,301 A | * | 10/1989 | Buse | 417/420 |
| 5,221,503 A | | 6/1993 | Ward et al. | 264/104 |
| 5,687,471 A | | 11/1997 | Noguchi et al. | 29/598 |
| 5,831,364 A | * | 11/1998 | Buse | 310/156.28 |
| 5,915,931 A | * | 6/1999 | Lindner et al. | 417/420 |
| 6,339,271 B1 | * | 1/2002 | Noble et al. | 310/74 |
| 6,443,710 B1 | * | 9/2002 | Tatsukami et al. | 417/365 |

FOREIGN PATENT DOCUMENTS

EP    2323217 A    9/1998

* cited by examiner

*Primary Examiner*—Burton Mullins
(74) *Attorney, Agent, or Firm*—Kalow & Springut LLP (57) ABSTRACT

A mechanical drive system operating by magnetic force, to be fitted on a pump, comprises a basic structure on which a drive shaft, which extends along a longitudinal axis, is supported rotatably. A driving element operatively connected to the drive shaft is provided with driving magnets arranged in a ring. A driven element provided with driven magnets arranged in a ring is also mounted on the basic structure. A bell is inserted between the driving element and the driven element and isolates the environment containing the driven element. The driving element and the driven element comprise respective cages each having seats for housing the respective driving magnets or driven magnets.

26 Claims, 9 Drawing Sheets

MECHANICAL DRIVE SYSTEM OPERATING BY MAGNETIC FORCE

FIELD OF THE INVENTION

The subject of the present invention is a mechanical drive system operating by magnetic force, comprising a basic structure, a drive shaft supported rotatably on the basic structure and defining a longitudinal axis, a driving element operatively connected to the drive shaft and provided with driving magnets, and a driven element mounted on the basic structure and provided with driven magnets.

Further subjects of the present invention are a magnet for a drive system of the type specified above and a method of producing a mechanical drive system operating by magnetic force in which a driving element provided with driving magnets is produced, a driven element provided with driven magnets is produced, and the driving element and the driven element are mounted on a basic structure, the driving magnets facing the driven magnets in order to transmit the drive from the driving element to the driven element.

According to a further aspect, a subject of the present invention is a pump comprising a basic structure, a drive shaft supported rotatably on the basic structure, an impeller supported rotatably on the basic structure and driven by the drive shaft, and a mechanical drive system operating by magnetic force, operatively connected to the drive shaft and to the impeller.

A further subject of the present invention is an accessory usable in a mechanical drive system operating by magnetic force of the type specified above.

BACKGROUND OF THE INVENTION

A magnetic drive system of the type indicated above is known and is used, for example, for driving rotary pumps and, more specifically, centrifugal pumps, for example, for use in the presence of fluids which are hazardous because they are corrosive or highly polluting.

In the situation specified above, the driving element is generally the output shaft of an electric motor, although rotary motors of other types may be used, and the driven element, naturally, is part of an impeller of the centrifugal pump.

Pumps which use drive systems of this type are known as so-called "seal-less" pumps, that is, pumps in which the drive is transmitted from the driving element to the driven element, and hence to the impeller, without the interposition of seals.

Drive systems of this type, and consequently pumps of this type, are used mainly in chemical plants in which one of the most important requirements relates to the limitation of emissions and particularly of possible emissions from the seal of the shaft. In fact, as is known, in drive systems of the type indicated above, the driving element is not in contact with the driven element since a containment element, commonly known as a bell, is interposed between the two and, together with the basic structure, encapsulates the environment containing the impeller and confines the liquid inside the pump, thus preventing the risk of emissions.

As is known, a drive system of this type has a first ring constituted by a plurality of magnets fixed to the driven element and having alternating opposite polarities and a second ring, constituted by a plurality of magnets fixed to the driving element and having alternating opposite polarities. The two rings are coaxial and face one another. Naturally, the driving element and the driven element are also arranged in a manner such that each magnet of the driving element faces a magnet of the driven element having the opposite polarity. As a result, a rotation of the drive shaft, and hence of the driving element, tends to move magnets of the same polarity and disposed on the two elements, respectively, towards one another. The driven element is consequently urged to rotate as a result of the repulsion between the polarities of the same sign belonging to the driving element and to the driven element, respectively.

In the case of the impeller, that is, of the driven element, a known drive system has a sleeve of magnetic material, for example, ferrite steel, on which the magnets are positioned at regular intervals and glued so as to close the magnetic flux. The sleeve to which the magnets are glued becomes an insert to be incorporated in a casting of plastics material, for example, polypropylene.

In the case of the driving element, which generally represents the outer portion of the drive system, use is also made of a sleeve on which the magnets are positioned and glued at regular intervals. The sleeve can then be covered with a protective layer or incorporated in a moulding.

In both cases, the mounting of the magnets requires them to be fitted on a sleeve of magnetic material to which they adhere by magnetic attraction and to which they are also fixed by gluing.

The drive systems described above, and consequently the pumps which use them, have considerable disadvantages which can be summarized as follows. In the first place, the correct positioning and fixing of the magnets involves great skill on the part of the operator who performs the assembly since the magnetic forces in play are quite large to the extent that, during the last portion of its movement towards the sleeve, the magnet is pulled against the sleeve. Since the operator loses control of the magnet during the last portion of its movement, it is difficult to achieve a high degree of accuracy in the positioning of the magnets on the sleeve and, in the event of incorrect positioning, it is practically impossible to detach a magnet in order to reposition it. Moreover, the force with which the magnet is drawn against the sleeve is often of a magnitude such as to damage the magnet and in particular its edges and to introduce risks to the safety of the operator's fingers.

In the second place, the step of the gluing of the magnets slows down production and does not offer a secure restraint, particularly in relation to the centrifugal forces which are exerted on the magnets in operation, particularly in the case of the impeller, and hence of the driven element.

These disadvantages are aggravated as the number of magnets increases and, in particular, when there are several rings of magnets to be fixed both to the driven element and to the driving element.

In addition to the foregoing disadvantages, there is the fact, with regard to the shape of the magnets in particular, that there are sharp edges which may give rise to dangers to the operator.

Finally, it should be borne in mind that the number of magnets affects the transmission which the system can achieve. As a result, the number of magnets to be used depends on the process conditions to be established and, for known drive systems, it is therefore necessary to maintain a store with a series of sleeves having different numbers of glued magnets.

The problem upon which the present invention is based is that of proposing a mechanical drive system operating by magnetic force, a magnet for a mechanical drive system operating by magnetic force, a method of producing a mechanical drive system operating by magnetic force, and a pump, which have structural and functional characteristics such as to satisfy the above-mentioned requirements and, at the same time, to overcome the disadvantages mentioned with reference to the prior art.

SUMMARY OF THE INVENTION

This problem is solved by means of a mechanical drive system operating by magnetic force of the type specified above, characterized in that at least one of the driving element and the driven element of the drive system comprises a cage provided with seats for housing the respective driving magnets or driven magnets.

The problem is also solved by means of a magnet for a mechanical drive system operating by magnetic force according to the present invention, by means of a method of producing a mechanical drive system operating by magnetic force according to the present invention, by means of a pump according to the present invention, and by means of an accessory usable in a mechanical drive system operating by magnetic force according to the present invention.

BRIEF DESCRIPTION OF THE DRAWINGS

Further characteristics and the advantages of the drive system, of the magnet, and of the method according to the invention will become clear from the following description of a preferred embodiment, given by way of non-limiting example, with reference to the appended drawings, in which.

DETAILED DESCRIPTION OF THE INVENTION

With reference to the drawings, a mechanical drive system operating by magnetic force, hereinafter also defined simply as a drive system, is generally indicated 1, and an impeller of a centrifugal pump which the system is preferably used to drive, is indicated 2.

A driven element forming part of the drive system 1 is indicated 3. The driven element 3 is fixed to a driven shaft 4 which terminates in the pump impeller 2.

A driving element forming part of the drive system 1 is indicated 5. The driving element 5 is fixed to a hub 6 to which a drive shaft 7, driven, for example, by an electric motor 8, is keyed.

Both of the elements 3 and 5 of the magnetic drive system 1 have a hollow cylindrical configuration. In particular, the driving element 5 has a larger diameter than the driven element 3 so that the latter can be positioned coaxially inside the driving element 5.

The driven element 3 has a set of driven magnets 9 and the driving element 5 has a set of driving magnets 10. Each set extends around a ring of the respective element 3 or 5 of the drive system and the sets are coaxial. Moreover, two adjacent magnets forming part of the same set have opposite polarities.

The driven magnets 9 face the driving magnets 10 with the interposition of a containment element, also commonly known as a bell, indicated 11 in the drawings.

The bell is in fact cup-shaped and is arranged coaxially between the two elements 3 and 5 of the drive system with its edge fixed hermetically to a casing 12 housing the impeller.

The bell 11 thus separates the driven element 3 from the driving element 5, defining inside the casing 12 an environment which is sealed from the exterior and contains the fluid in which the impeller 2 is immersed.

Figure 1:
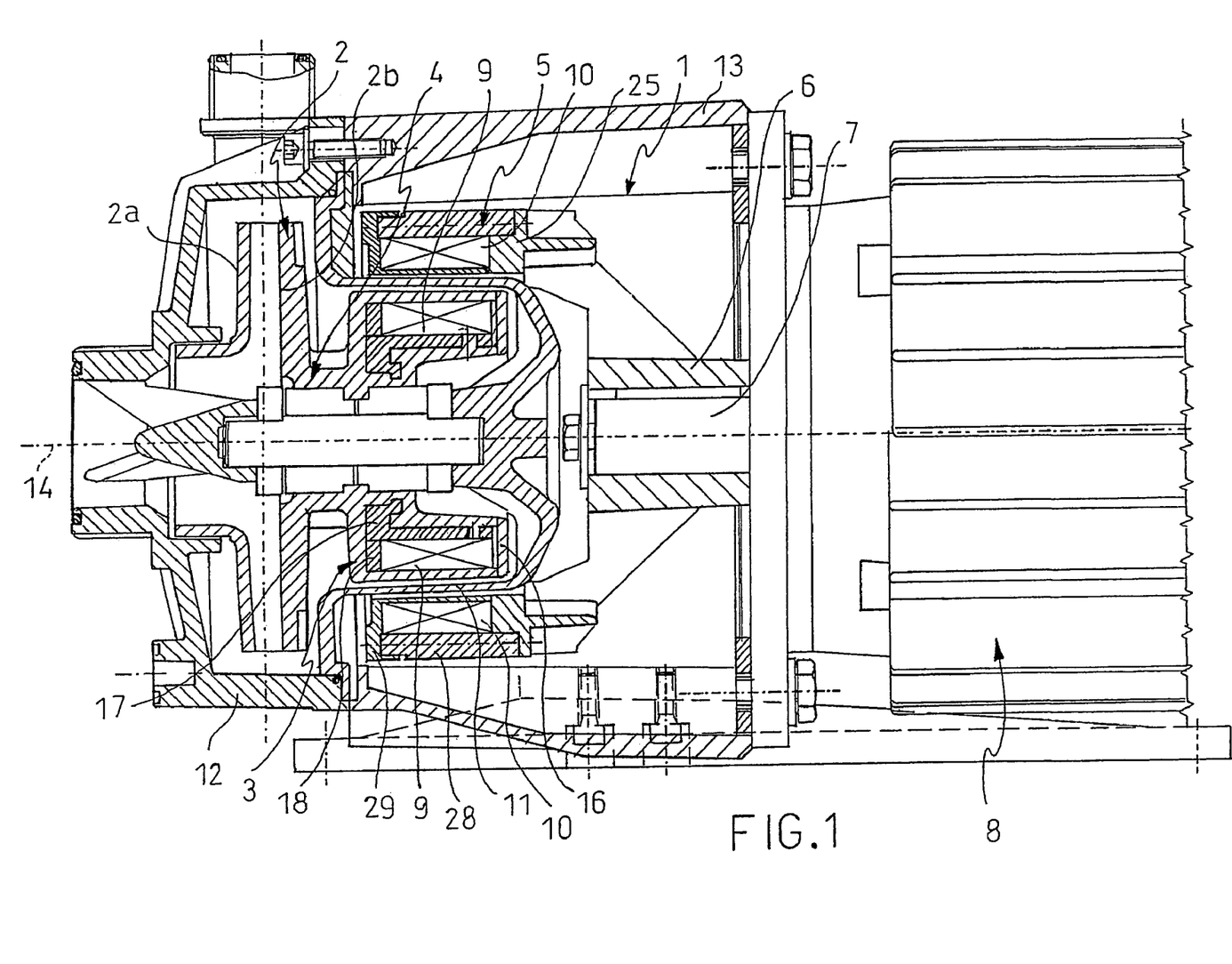
FIG. 1 shows, in longitudinal section, a centrifugal pump comprising a mechanical drive system operating by magnetic force, according to the present invention.

As shown in FIG. 1, the driven element 3 is mounted rotatably in the casing 12 and in the bell 11 whereas the driving element 5 is mounted rotatably in an outer housing 13. The bell 11, the casing 12 and the outer housing 13 define a basic structure on which the drive system 1 is mounted.

Figure 2:
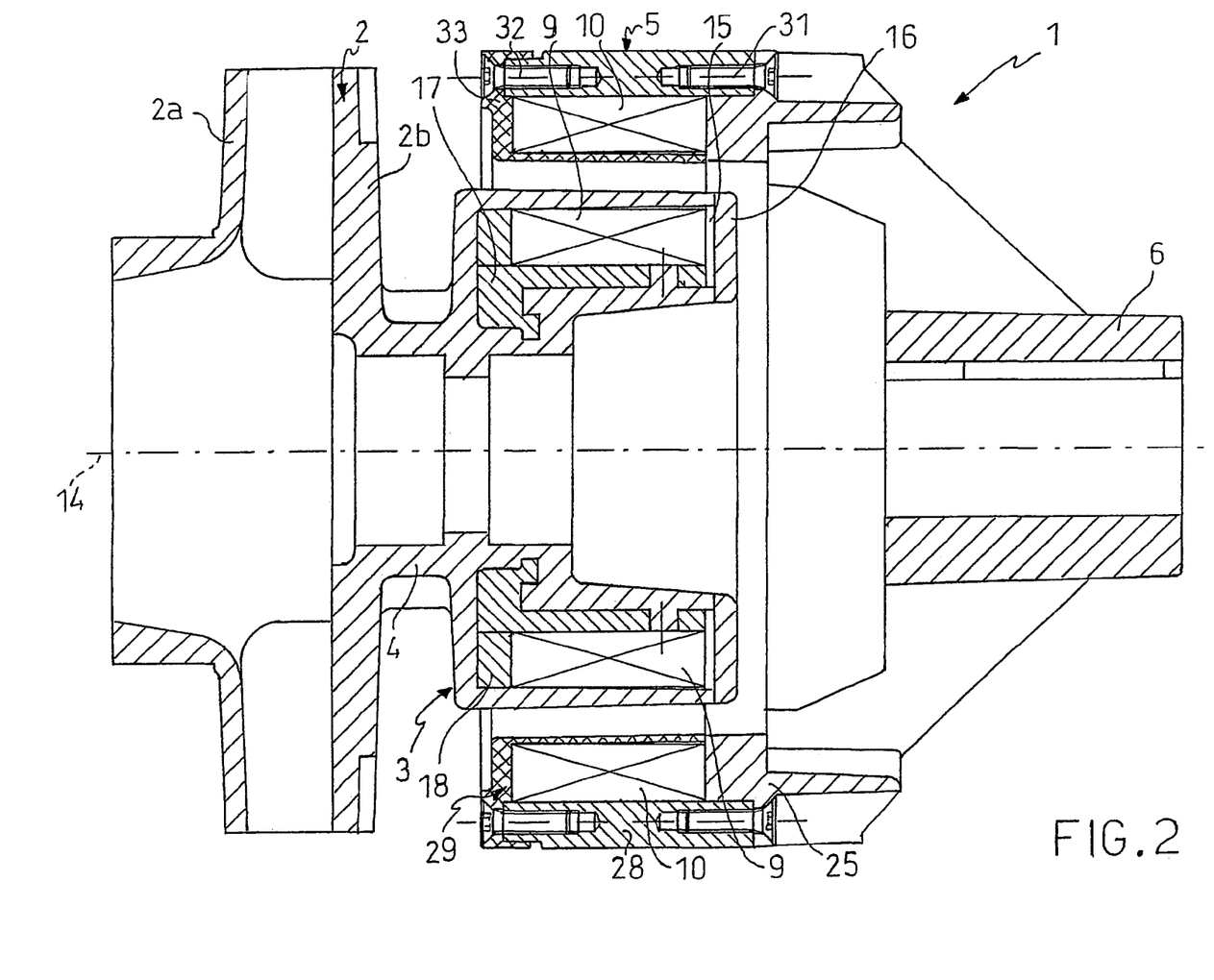
FIG. 2 shows a detail of FIG. 1, on an enlarged scale.
Figure 3:
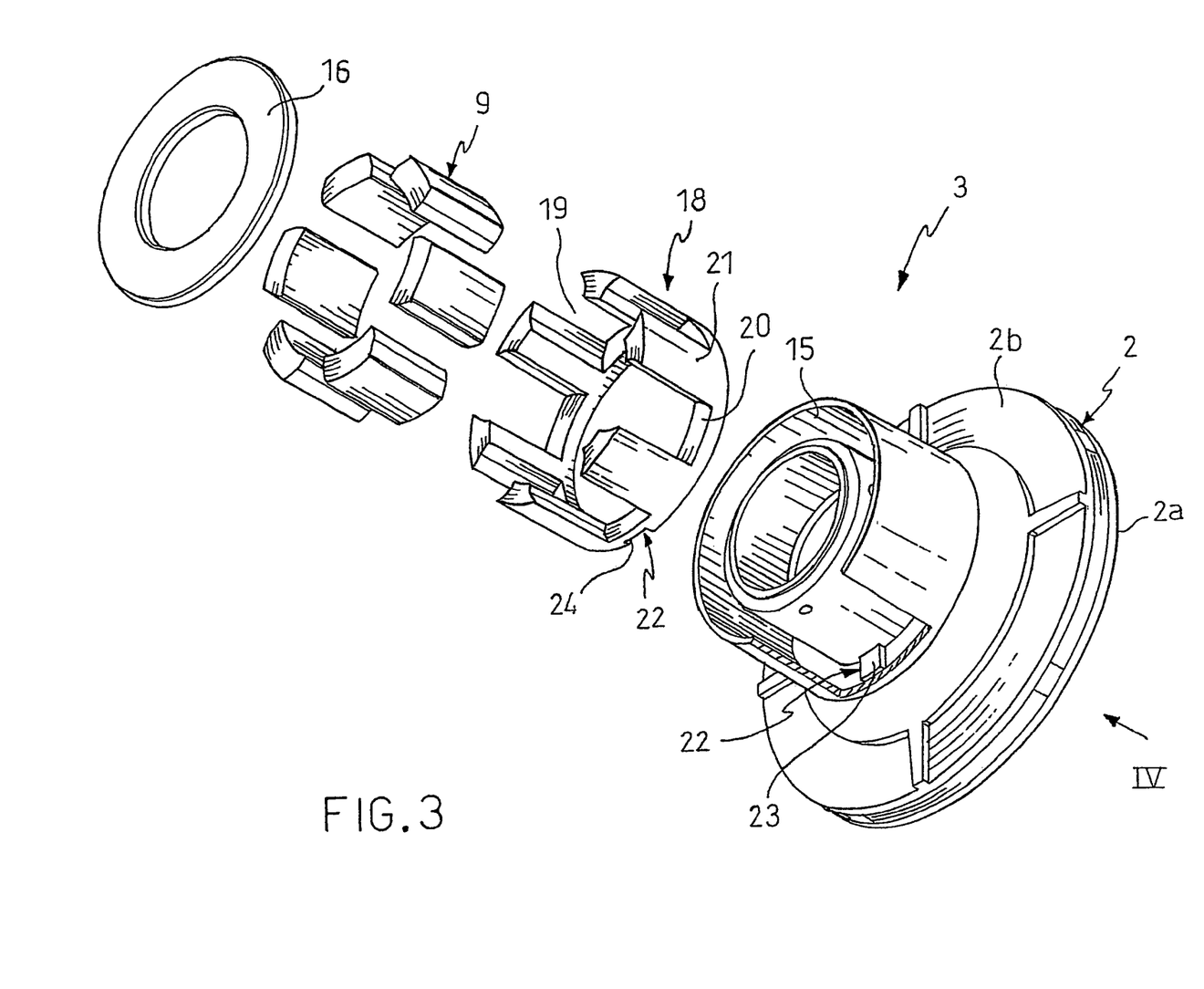
FIG. 3 is a partially-sectioned, exploded perspective view of a detail of FIG. 1.
Figure 4:
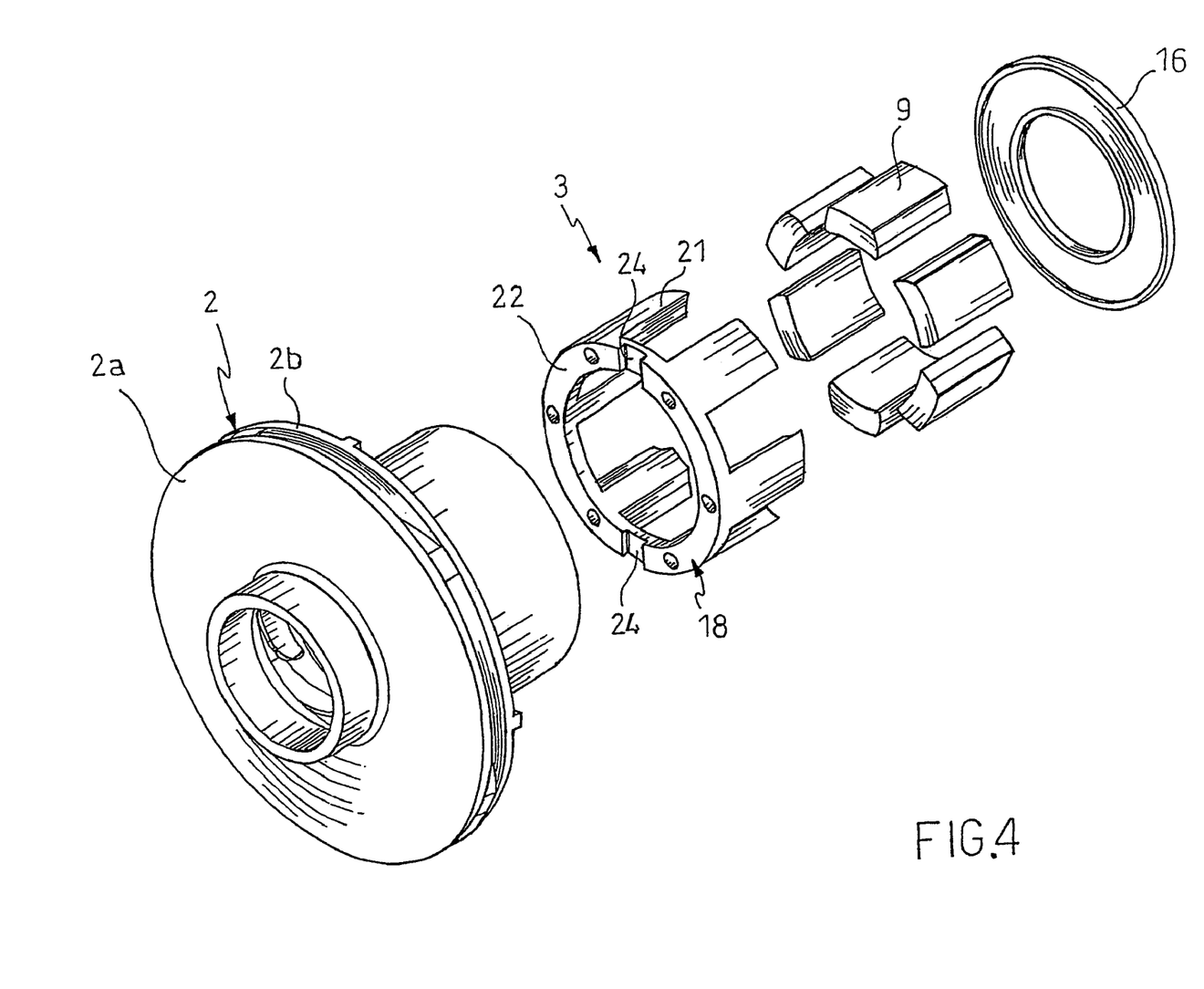
FIG. 4 shows the exploded detail of FIG. 3, viewed in accordance with the arrow IV of FIG. 3.
Figure 5:
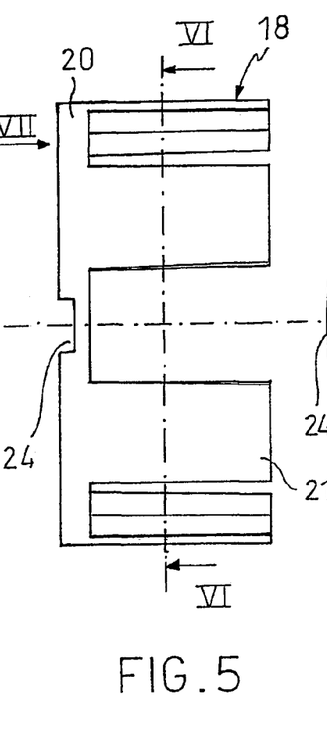
FIG. 5 is a side view of a detail of FIGS. 3 and 4.

FIG. 2 shows an enlarged detail of the drive system 1 of FIG. 1, with reference to the characteristics of the elements 3 and 5 and their relative positions, without the interposition of the bell 11.

It can be seen from the drawing that the impeller 2 is composed of a shield 2a and of an actual impeller 2b, both made of plastics material such as, for example, PP ETFE (polypropylene and ethylene-tetrafluoroethylene copolymer). According to one embodiment, the driven shaft 4, the impeller 2b, and the driven element 3 are moulded in one piece.

In particular, the driven shaft 4, the impeller 2, and the driven element 3 extend substantially axially symmetrically along a longitudinal axis 14. This axis coincides substantially with the extension of the longitudinal axis about which the drive shaft 7 rotates and around which the driving element 5 is also disposed.

The driven element 3 has a hollow cylindrical shape the side wall of which comprises a space 15 for housing the driven magnets 9.

More specifically, the space 15 has a cylindrical shape extending along the longitudinal axis 14 and is accessible from a front surface which faces towards the hub 6 of the drive shaft 7 and hence away from the impeller 2. The space 15 is closed in this surface by a closure element 16 also commonly known as a base, constituted by a ring welded to the driven element 3.

As a result, the space 15 has a cylindrical shape coaxial with the driven element 3 and with the impeller 2 and is isolated from the environment which contains the process fluid.

The driven element 3 is moulded around a metal insert 17 which is also substantially cylindrical and is arranged coaxially relative both to the driven element 3 and to the space 15.

In particular, the metal insert 17 defines a wall of the space 15, for example, the inner wall, with respect to the longitudinal axis 14.

For the positioning and the fixing of the driven magnets inside the space 15, the driven element 3 comprises, in a novel manner, a cage 18 having seats 19 of a shape complementary to the shape of the driven magnets 9.

As shown in the drawings, the cage 18 comprises a ring 20 from which projections 21 distributed uniformly around the circumference of the ring, extend transversely. Two consecutive projections 21 define the sides of one of the seats 19 for housing one of the driven magnets 9.

The projections 21 are designed in a manner such that the walls of two consecutive projections define a restraint in relation to tangential and outward radial displacement of the driven magnets, thus keeping the magnets uniformly spaced around a circumference of the driven element and reacting to the centrifugal force to which the driven magnets are subject when the pump is in operation. This condition is achieved by a particular configuration of the cross-section of the projections, "cross-section" meaning the section which is shown in FIG. 6 and is obtained by sectioning the projections in a plane perpendicular to the longitudinal axis 14.

Figure 6:
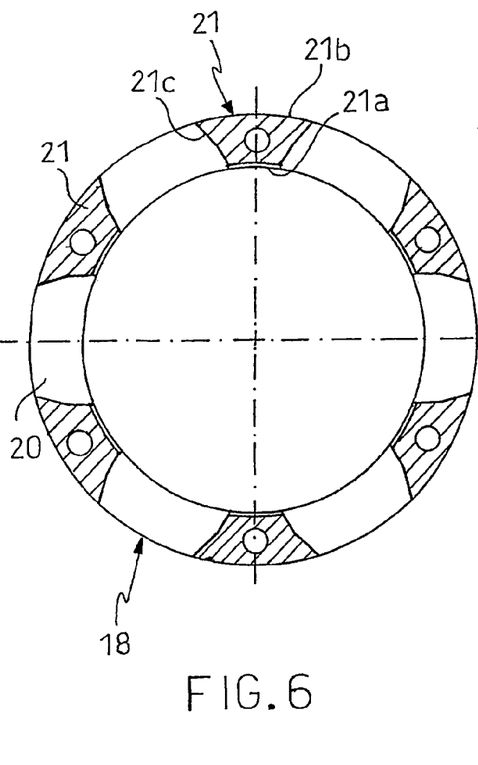
FIG. 6 shows the detail of FIG. 5, sectioned on the line VI—VI of FIG. 5.
Figure 7:
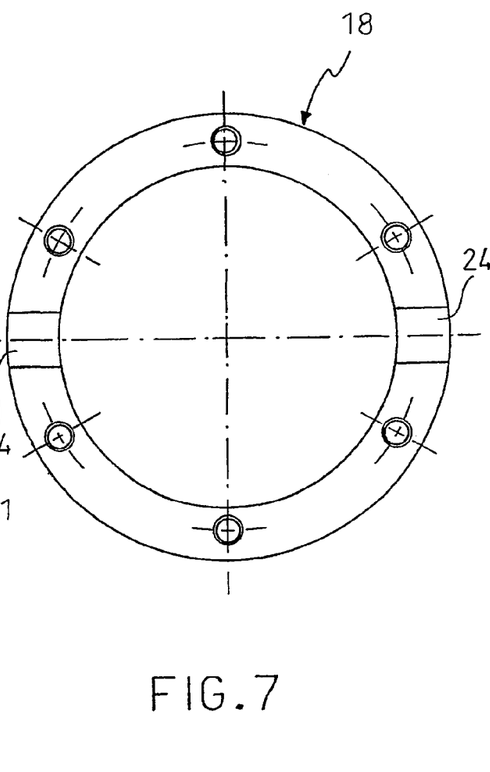
FIG. 7 is a profile view of the detail of FIG. 5, viewed along the line VII of FIG. 5.

In fact, as shown in FIG. 6, the shape of this cross-section is defined by an inner circumference portion 21a and an outer circumference portion 21b connected by profiles 21c having various inclinations. The cross-section of each projection 21 has larger dimensions along the outer circumference portion 21b than along the inner portion 21a so that the walls of the projections 21 corresponding to the profiles 21c define shoulders constituting both guide elements for the insertion of the magnets and restraints which prevent tangential and outward radial displacement of the driven magnets 9. The cage 18 thus houses the driven magnets 9 and prevents them from losing their original positions, for example, by moving apart under the effect of the centrifugal force, when the pump is in operation.

The profiles 21c advantageously take the form of discontinuous lines so as to fit the profiles of the corresponding driven magnets 9.

Figure 8:
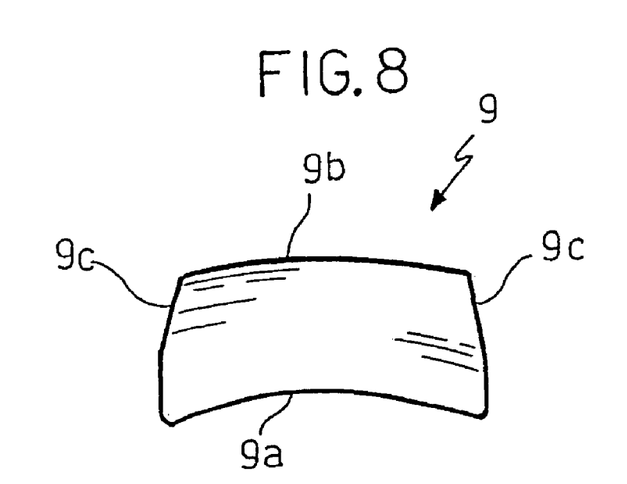
FIG. 8 is a profile view of a detail of FIGS. 3 and 4.
Figure 9:
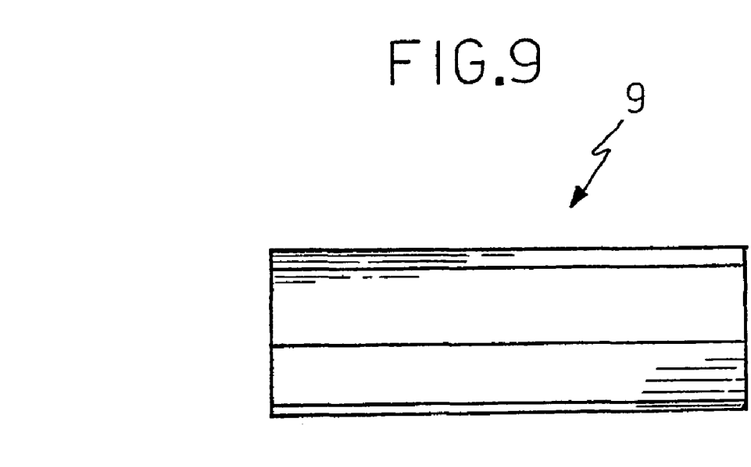
FIG. 9 is a side view of the detail of FIG. 8.

The driven magnets 9 in fact correspondingly have a novel shape shown in FIG. 8 and in FIG. 9. The former is a profile view of a driven magnet 9 and the latter is a side view of the magnet of FIG. 8. The profile view shows a shape complementary to the shape of the seats 19 of the cage 18. In particular, the profile shape of each driven magnet 9 is defined by an inner circumference portion 9a and by an outer circumference portion 9b connected by discontinuous lines 9c. The portions of the two discontinuous lines 9c closest to the outer circumference portion are inclined, at about 30° to one another in order to fit the respective shape of the projections 21 and, in particular, the profile 21c. The portions of the discontinuous lines 9c correspond to two side walls which are thus at least partially inclined to a longitudinal plane of symmetry.

The inner and outer circumference portions. 9a and 9b are connected to the discontinuous lines 9c with the interposition of portions which are chamfered, for example at 45°, so as to avoid sharp edges which could constitute a danger to the operator during handling.

Moreover, when the magnets are housed in the respective seats 19, the inner and outer circumference portions 9a and 9b of the driven magnets 9 are extended substantially by the inner and outer circumference portions 21a and 21b of two adjacent projections. As a result, the fitting together of the cage 18 and the driven magnets 9 forms a cylindrical wall with alternating magnetic polarities around the circumference of the cylinder so that the cage 18 defines a support for the driven magnets 9 irrespective of whether they are inserted in the space 15.

The cage 18 is advantageously made of non-magnetic material which does not therefore present problems of adhesion to the magnets during assembly. In the embodiment shown, the cage 18 is advantageously made of plastics material such as, for example, glass-filled PPS (glass-filled polyphenylene sulphide) which offers good mechanical strength but limited resistance to corrosive fluids.

The cage 18, together with the set of driven magnets 9, is inserted in the space 15 and is thus arranged coaxially with the driven element 3, the driven shaft 4, and the impeller 2. The cage 18 with the respective driven magnets 9 is isolated from the environment which contains the process fluid by virtue of the fitting of the closure element 16.

As shown, for example, in FIG. 1 and in FIG. 2, the cage 18 keeps the driven magnets correctly positioned inside the space 15 and distributed an regular intervals around the lateral surface of the cylindrical body of the driven element 3. In particular, the cage 18 interacts with the magnets throughout their depth and the inner surfaces of the magnets are in contact with the metal insert 17.

Drive means which fix the cage 18 and the driven element 3 for rotation together about the longitudinal axis 14 are indicated 22. In the embodiment illustrated, the drive means comprise two axial drive teeth 23 formed on diametrally opposed sides of the driven element 3 and, in particular, in the inner end of the space 15.

Two respective recesses 24 are formed in diametrally opposed positions in the surface of the ring 20 of the cage 18, for receiving the drive teeth 23.

FIG. 2 also shows the driving element 5 associated with the hub 6. A ring 25 extending from the hub 6 is enlarged in comparison with the dimensions of the hub and has a series of holes 26 distributed around the periphery of the ring. The hub 6 and the ring 25 extend along the longitudinal axis 14.

Figure 10:
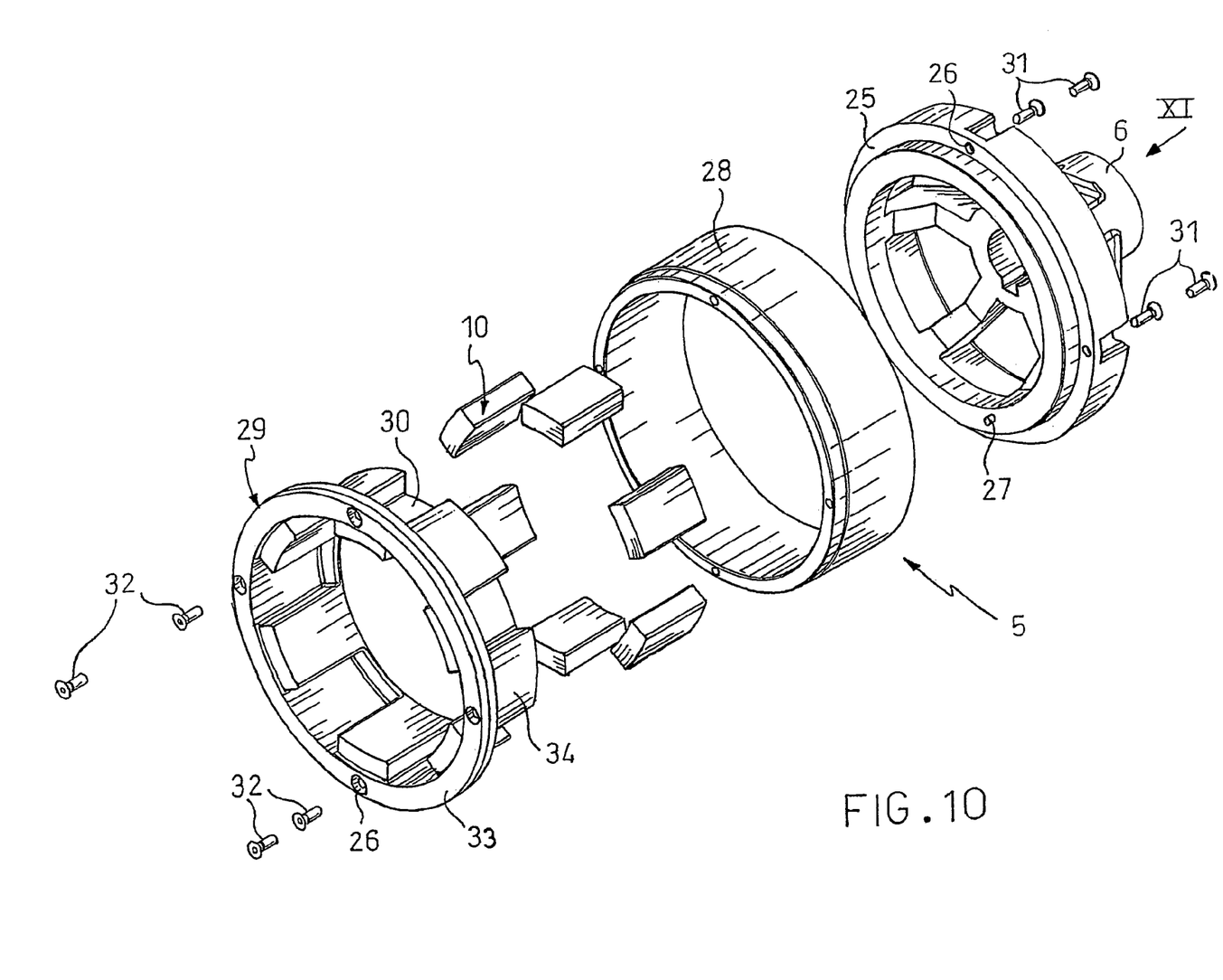
FIG. 10 is an exploded, perspective view of a detail of FIG. 1.
Figure 11:
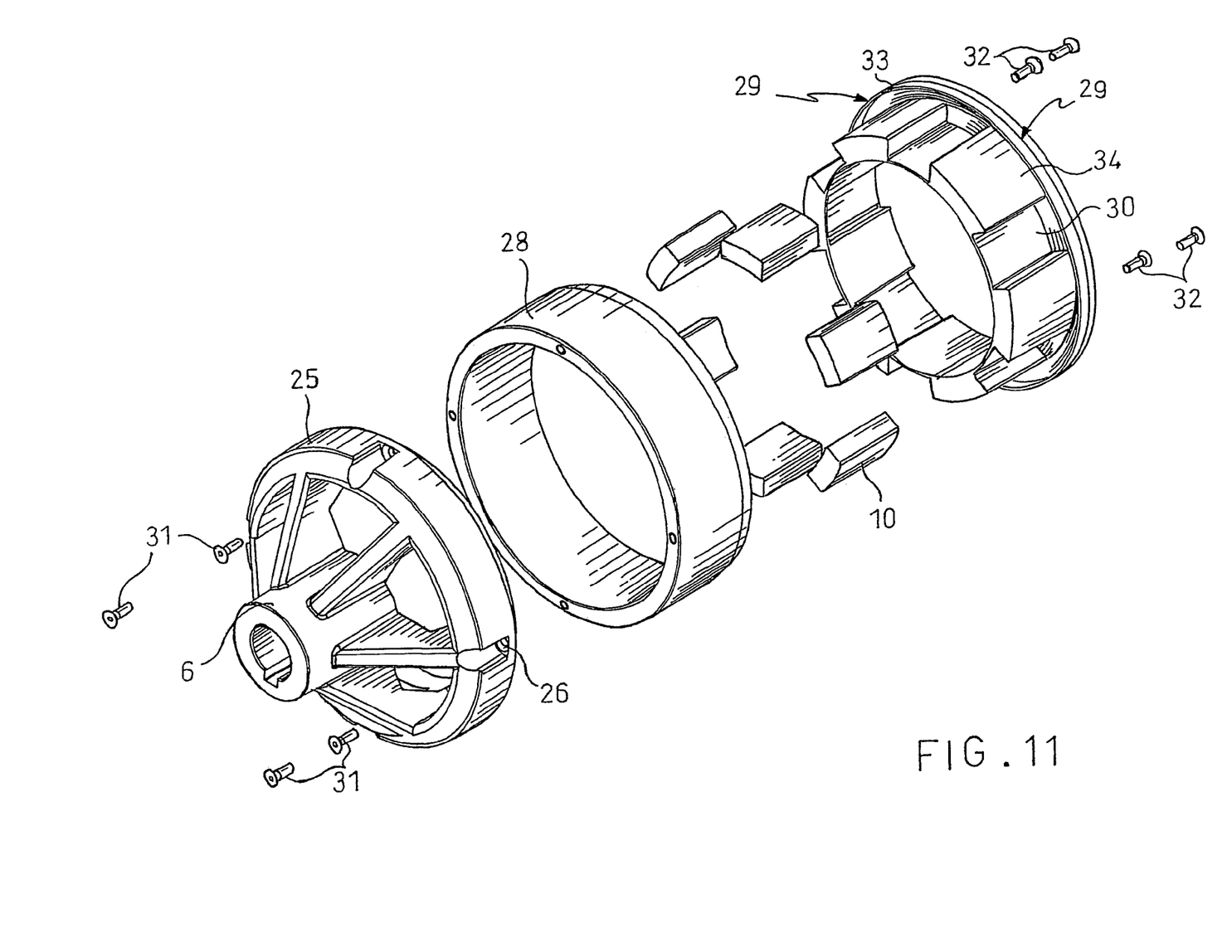
FIG. 11 shows the exploded detail of FIG. 10, viewed in accordance with the arrow XI of FIG. 10.
Figures 12, 13:
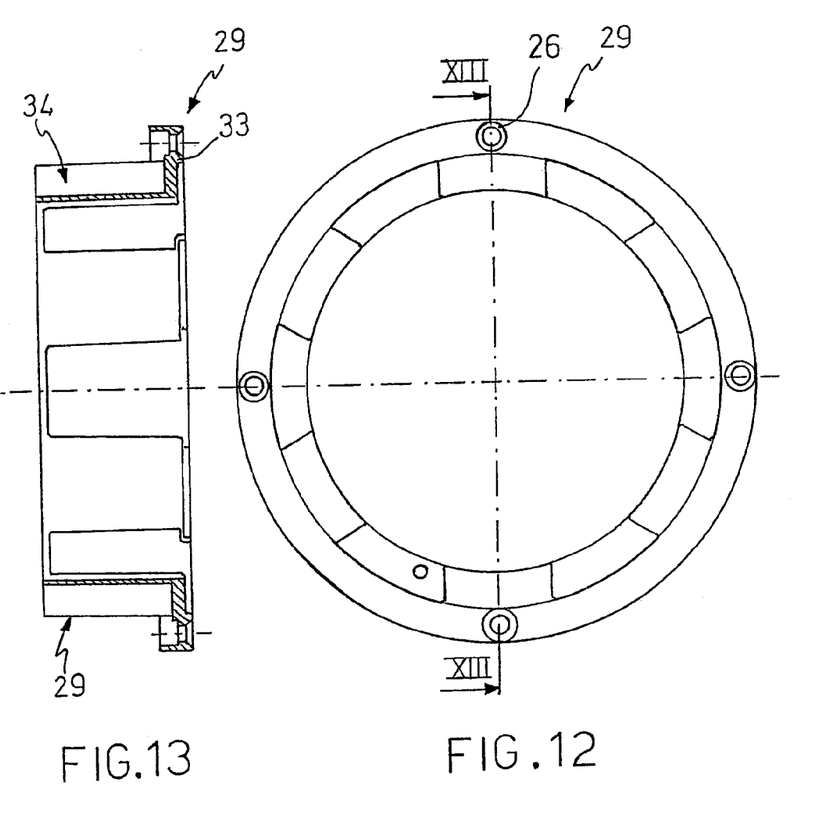
FIG. 12 is a front profile view of a detail of FIGS. 10 and 11.
FIG. 13 shows the detail of FIG. 12 sectioned along the lines XIII—XIII of FIG. 12.
Figure 14:
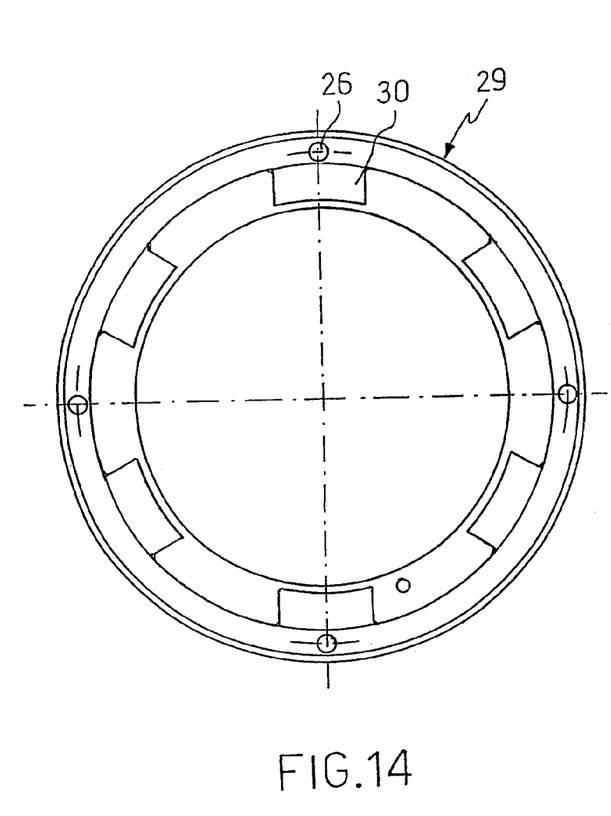
FIG. 14 is a rear profile view of the detail of FIG. 12.

As shown in FIG. 10, the front surface of the ring 25 also has a locating pin 27.

Moreover, a metal insert in the form of a sleeve which bears against the front surface of the ring 25 is indicated 28 and a cage provided with seats 30 having a shape complementary to the shape of the driving magnets 10 is indicated 29.

The metal insert 28 has a first end which can be connected to the ring 25 by means of threaded elements 31 inserted in the holes 26 and a second end which can be connected to the cage 29. This latter connection may also be formed by threaded elements 32.

In the same manner as the cage 18 of the driven element 3, the cage 29 of the driving element 5 also comprises a ring 33 from which projections 34, distributed uniformly around the circumference of the ring, extend transversely. In contrast with the cage 18, the projections 34 of the cage 29 are constituted by a single cylindrical wall with longitudinal channels which define the sets 30 for housing the driving magnets 10. Each seat 30 is thus defined on three sides which interact with the base and the side walls of each driving magnet 10, respectively. The shape of the cage 29 and, in particular, of the projections 34, defines shoulders such as to constitute guide elements for the insertion of the magnets, to keep the magnets correctly spaced in a tangential direction, and to define a restraint in relation to inward radial displacement of the magnets. Outward displacement is prevented by the sleeve 28. The interaction between the cage 29 and the driving magnets 10 advantageously extends throughout the depth of the magnets.

Figure 15:
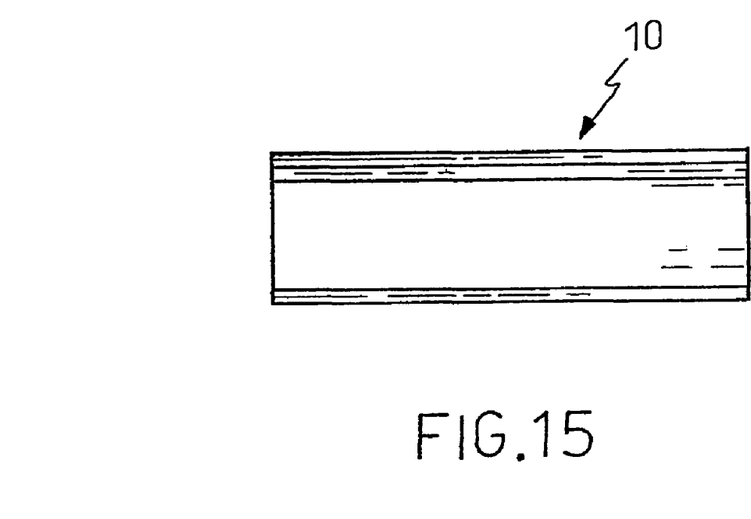
FIG. 15 is a profile view of a detail of FIGS. 10 and 11.
Figure 16:
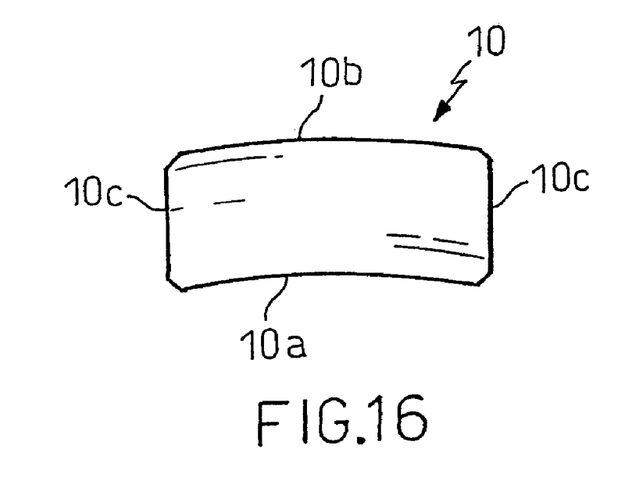
FIG. 16 is a side view of the detail of FIG. 15.

The driving magnets 10 correspondingly have a novel shape illustrated in FIGS. 15 and 16. The former is a profile view of a driving magnet and the latter is a side view of the magnet of FIG. 15. The profile view shows a shape complementary to the shape of the seats 30 of the cage 29. In particular, the profile shape of each magnet is defined by an inner circumference portion 10a and by an outer circumference portion 10b connected by means of a profile 10c. All of the corners are chamfered, for example, at 45°, so as to avoid sharp edges which could constitute a danger to the operator.

In the same manner as the cage 18 of the driven element 3, the cage 29 of the driving element 5 is also made of non-magnetic material to facilitate the positioning of the driving magnets 10. When this positioning has been achieved, the cage 29 constitutes a support for the driving magnets 10, irrespective of whether it is coupled with the driving element 5.

The novel method of producing the magnetic drive system 1 according to the present invention is described below.

The method provides for a step for the production of a driven element 3 provided with a set of driven magnets 9 and a step for the production of a driving element 5 provided with a set of driving magnets 10.

The step for the production of the driven element 3 provides for the formation of a space 15 inside the driven element 3. In the embodiment shown in the drawings, the driven element 3 provided with a space is produced by the moulding of a plastics material around a metal insert 17. The driven element 3 may, for example, be produced integrally with the driven shaft 4 and, in the specific embodiment, with the impeller 2.

To complete the production of the driven element 3, a cage 18 is formed separately and the driven magnets 9 are inserted in seats 19 of the cage 18 in a direction parallel to the longitudinal axis along which the cage extends.

The fitting together of the cage and the magnets thus produces an internally hollow cylinder the side wall of which is composed of an alternating succession of magnets and projections. This cylinder is then inserted in the space 15 in the driven element 3 to which a closure element 16 is applied to close the space after the insertion of the cage provided with the magnets.

Inside the space 15, the magnets are positioned in contact with the metal insert 17 and the cage 18 is coupled with the driven element 3 by drive means 22. In particular, during the insertion of the cage and of the magnets inside the space 15, two recesses 24 of the cage 18 abut the driving teeth 23 formed in the base wall of the space.

The step for the production of the driving element 5 provides for the assembly of the set of driving magnets 10 and the cage 29. The cage is fixed to a sleeve 28 by means of threaded elements 32. The sleeve 28 is then fixed to the structure of a hub 6 by means of further threaded elements 31.

Finally, the driven element 3 and the driving element 5 are mounted in the final position, for example, as shown in FIG. 1 and in FIG. 2, in which the set of driven magnets 9 faces the set of driving magnets 10.

It can be appreciated from the foregoing that the provision of a cage 18 and/or a cage 29 for the driven element 3 and for the driving element 5, respectively, Simplifies and speeds up the mounting and fixing of the magnets on the respective structures. The presence of a cage in fact enables the magnets to be kept uniformly distributed around the cylindrical shapes of the two elements of the drive system 1 and to be restrained effectively at least in a radial direction. The fitting together of the cage and the respective magnets permits the optional provision of a pre-assembled accessory for use in a system according to the present invention.

Each cage is advantageously made of non-magnetic material which does not therefore present problems of adhesion to the magnets during the mounting of the respective magnets. This solution enables the magnets to be mounted quickly and easily and is also advantageous from the point of view of the operator's safety, irrespective of his skill, since it is possible to correct incorrect positionings.

This operation is rendered particularly easy by virtue of the fact that no magnetic attraction force is exerted between the cage and the magnets so that the magnets can be fitted in and removed from their respective seats in order to position them correctly. This is achieved without risks to the operator's safety and purely by means of a form fit between the magnets and the cage, since the seats of the cage have a shape complementary to the shape of the magnets.

The closure of the magnetic flux between the magnets is ensured by metal inserts, relative to which the magnets are positioned, together with the cage, that is, when their relative positions are already defined.

The presence of the cage also enables the magnets to be shaped suitably to avoid sharp edges which might injure the operator performing the assembly, making maximum use of the available ring and facilitating its handling.

The novel shape described above is particularly advantageous, above all, for the cage 18 of the driven element 3. The cage 18 can in fact be made of a material with good mechanical strength, but with poor chemical resistance. The latter is in fact got over by virtue of the presence of the space 15 which is completely closed from the environment 13 by the closure element 16.

The structure produced, particularly in the case of the driven element, is stiffer than known structures, is better able to withstand any processing subsequent to assembly, and is more stable dimensionally.

As can be appreciated from the foregoing description, the drive system and the production method according to the present invention satisfy the need to provide a drive system without the need for any gluing or skilled labour.

Moreover, the novel shape of the magnets according to the invention avoids dangers due to the presence of sharp edges.

A further advantage of the magnetic drive system according to the invention lies in its unusual structural simplicity which enables it to be produced at a very low cost.

The presence of the cage, by virtue of which the magnets are positioned more accurately and the drive system as a whole is more reliable, is particularly advantageous. In fact, in addition to the fact that it is not made of magnetic material, which would attract the magnet in an uncontrolled manner, the cage also resists the effects of the centrifugal force safely and constantly over time.

Clearly variants and/or additions may be provided for the embodiments described and illustrated above.

The embodiments described above illustrate a particular application of the drive system 1 to a centrifugal pump. Naturally, the magnetic drive system 1 according to the present invention may be fitted in any type of device in which it is necessary to transmit drive from a drive shaft 7 to a driven shaft 4.

In order to satisfy contingent and specific requirements, an expert in the art may apply to the above-described preferred embodiment of the magnetic drive system and the respective magnets, many modifications, adaptations and replacements of elements with other functionally equivalent elements without, however, departing from the scope of the appended claims.

What is claimed is:

1. A mechanical drive system operating by magnetic force, comprising:
   a basic structure,
   a drive shaft supported rotatably by the basic structure and defining a longitudinal axis,
   a driving element operatively connected to the drive shaft and provided with driving magnets, and
   a driven element mounted on the basic structure and provided with driven magnets,
   at least one of the driving element and the driven element of the drive system comprising a cage provided with seats for housing the respective driving magnets or driven magnets, wherein said seats have a shape complementary to the shape of the magnets and define projections or shoulders which restrain radial displacement of the driving magnets or of the driven magnets, and
   at least one of the driving element and the driven element comprises a metal insert.

2. A drive system according to claim 1 in which the cage is made of non-magnetic material.

3. A drive system according to claim 2 in which the cage is made of plastics material.

4. A drive system according to claim 1 in which the cage comprises at least one ring from which projections, distributed around the circumference of the ring, extend transversely, two adjacent projections defining the sides of a seat for housing a magnet.

5. A drive system according to claim 4 in which the cage is associated with the driving element and comprises projections which separate two adjacent driving magnets and define a restraint in relation to inward radial displacement of the driving magnets.

6. A drive system according to claim 1 in which the driven element comprises drive means operatively connected to the cage.

7. A magnet usable in a mechanical drive system operating by magnetic force according to claim 1, comprising two side walls at least partially inclined to a longitudinal plane of symmetry.

8. A magnet according to claim 7 in which the two side walls are inclined at about 30° to the longitudinal plane of symmetry.

9. A pump comprising:
   a basic structure,
   a drive shaft supported rotatably on the basic structure,
   an impeller which is supported rotatably on the basic structure and is rotated as a result of the rotation of the drive shaft,
   a mechanical drive system operating by magnetic force, operatively connected to the drive shaft and to the impeller,
   wherein the drive system is of the type according to claim 1.

10. A drive system according to claim 1 in which the cage defines tangential shoulders for the driving magnets or driven magnets, the tangential shoulders constituting guide elements for the insertion of the driving magnets or driven magnets in the cage.

11. A drive system according to claim 10 in which the tangential shoulders constitute a restraint which extends throughout the radial extent of the driving magnets or of the driven magnets.

12. An accessory usable in a mechanical drive system operating by magnetic force according to claim 1 or 10 comprising a cage in which driving magnets or driven magnets are housed.

13. A drive system according to claim 1 in which the cage constitutes a support for the respective driving magnets or driven magnets.

14. A mechanical drive system operating by magnetic force, comprising:
    a basic structure,
    a drive shaft supported rotatably by the basic structure and defining a longitudinal axis,
    a driving element operatively connected to the drive shaft and provided with driving magnets, and
    a driven element mounted on the basic structure and provided with driven magnets,
    the driven element of the drive system comprising a cage provided with seats for housing the driven magnets, wherein said seats have a shape complementary to the shape of the magnets and define projections or shoulders which restrain radial displacement of the driven magnets, and wherein the cage comprises at least one ring from which projections, distributed around the circumference of the ring, extend transversely, two adjacent projections defining the sides of a seat for housing a magnet, and wherein the projections have a cross-section with larger dimensions along an outer circumference portion than along an inner circumference portion, two adjacent projections defining a restraint in relation to outward radial displacement of the driven magnets.

15. A mechanical drive system operating by magnetic force, comprising:
    a basic structure,
    a drive shaft supported rotatably by the basic structure and defining a longitudinal axis,
    a driving element operatively connected to the drive shaft and provided with driving magnets, and
    a driven element mounted on the basic structure and provided with driven magnets,
    at least one of the driving element and the driven element of the drive system comprising a cage provided with seats for housing the respective driving magnets or driven magnets, wherein said seats have a shape complementary to the shape of the magnets and define projections or shoulders which restrain radial displacement of the driving magnets or of the driven magnets, and wherein the driven element comprises a space for housing the respective cage, together with the driven magnets.

16. Magnetic drive system according to claim 15 in which the driven element comprises an element for closing the space in order to isolate the cage from the outside environment.

17. A drive system according to claim 15 or 16 in which the driven element comprises a metal insert and the metal insert defines one of the walls of the space.

18. A drive system according to claim 17 in which the driven element is made of plastics material moulded around the metal insert.

19. A drive system according to claim 15 in which the driven element comprises drive means operatively connected to the cage and the drive means comprise at least one tooth formed in the walls of the space, for insertion in at least one recess formed in the cage.

20. A mechanical drive system operating by magnetic force, comprising:

a basic structure, a drive shaft supported rotatably by the basic structure and defining a longitudinal axis, a driving element operatively connected to the drive shaft and provided with driving magnets, and a driven element mounted on the basic structure and provided with driven magnets, the driving element comprising a cage provided with seats for housing the respective driving magnets, wherein said seats have a shape complementary to the shape of the magnets and define projections or shoulders which restrain radial displacement of the driving magnets, the cage comprising at least one ring from which projections, distributed around the circumference of the ring, extend transversely, two adjacent projections defining the sides of a seat for housing a magnet, the cage also comprising projections which separate two adjacent driving magnets and define a restraint in relation to inward radial displacement of the driving magnets, and in which the projections of the cage are formed in a single, longitudinally channelled, cylindrical wall.

21. A mechanical drive system operating by magnetic force, comprising:

a basic structure, a drive shaft supported rotatably by the basic structure and defining a longitudinal axis, a driving element operatively connected to the drive shaft and provided with driving magnets, and a driven element mounted on the basic structure and provided with driven magnets, the driving element comprising a cage provided with seats for housing the driving magnets, wherein said seats have a shape complementary to the shape of the magnets and define projections or shoulders which restrain radial displacement of the driving magnets, the cage comprising at least one ring from which projections, distributed around the circumference of the ring, extend transversely, two adjacent projections defining the sides of a seat for housing a magnet, the cage also comprising projections which separate two adjacent driving magnets and define a restraint in relation to inward radial displacement of the driving magnets, and in which the driving element comprises a metal insert and the cage is operatively connected to the metal insert which defines an outer wall for restraining the driving magnets.

22. A method of producing a mechanical drive system operating by magnetic force, which comprises producing a driving element with driving magnets, producing a driven element with driven magnets, and mounting the driving element and the driven element on a basic structure, so that the driving magnets are facing the driven magnets in order to transmit the drive from the driving element to the driven element, and wherein at least one of the driving element and the driven element is produced by inserting the driving magnets or the driven magnets in seats of a cage, the seats having a shape complementary to the shape of the magnets, and defining projections or shoulders which restrain radial displacement of the driving magnets or the driven magnets, the cage being mounted on the respective driving element or driven element, and wherein a space is formed in the driven element, the driven magnets are inserted in the seats of the cage, and the cage, provided with magnets, is inserted in the space in the driven element.

23. A method according to claim 22 in which, after the cage provided with magnets has been inserted in the space, the space is also closed in a leaktight manner.

24. A method according to claim 22 in which the step of the production of the driven element provided with the space is performed by moulding.

25. A method according to claim 24 in which the step of the moulding of the driven element is performed with plastics material around a metal insert.

26. A method of producing a mechanical drive system operating by magnetic force, which comprises producing a driving element with driving magnets, producing a driven element with driven magnets, and mounting the driving element and the driven element on a basic structure, so that the driving magnets are facing the driven magnets in order to transmit the drive from the driving element to the driven element, and wherein at least one of the driving element and the driven element is produced by inserting the driving magnets or the driven magnets in seats of a cage, the seats having a shape complementary to the shape of the magnets, and defining projections or shoulders which restrain radial displacement of the driving magnets or the driven magnets, the cage being mounted on the respective driving element or driven element, and the step of the production of the driving element also provides for the cage to be coupled with a metal insert.

* * * * *